US012560739B2

(12) United States Patent
Wallet et al.

(10) Patent No.: US 12,560,739 B2
(45) Date of Patent: Feb. 24, 2026

(54) MACHINE LEARNING OF GEOLOGY BY PROBABILISTIC INTEGRATION OF LOCAL CONSTRAINTS

(71) Applicant: Saudi Arabian Oil Company, Dhahran (SA)

(72) Inventors: Bradley Clark Wallet, Norman, OK (US); Rajesh Goteti, Katy, TX (US); Konstantin Osypov, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 1081 days.

(21) Appl. No.: 17/574,293

(22) Filed: Jan. 12, 2022

(65) Prior Publication Data

US 2022/0244423 A1     Aug. 4, 2022

Related U.S. Application Data

(60) Provisional application No. 63/143,712, filed on Jan. 29, 2021.

(51) Int. Cl.
*G06F 7/48* (2006.01)
*G01V 20/00* (2024.01)
(Continued)

(52) U.S. Cl.
CPC .............. *G01V 20/00* (2024.01); *G06F 30/27* (2020.01); *G06F 2111/10* (2020.01)

(58) Field of Classification Search
CPC ............. G01V 20/00; G01V 2210/642; G01V 2210/646; G06F 30/27; G06F 2111/10
See application file for complete search history.

(56) References Cited

U.S. PATENT DOCUMENTS 9,310,500 B2    4/2016   Kacewicz et al.
10,487,649 B2   11/2019   Tilke et al.
(Continued)

FOREIGN PATENT DOCUMENTS

WO    WO 2017035104     3/2017

OTHER PUBLICATIONS

U.S. Appl. No. 63/143,712, Wallet et al., filed Jan. 29, 2021.
(Continued)

*Primary Examiner* — Nithya J. Moll
(74) *Attorney, Agent, or Firm* — Fish & Richardson P.C.

(57) ABSTRACT

Systems and methods include a computer-implemented method: Seismic data is gathered for a reservoir with unknown fractured and unfractured areas. A structural model is generated. A geomechanical model is built. Geomechanically-estimated fractured areas are determined using the geomechanical model, including: areas where fractures are not likely to exist based on a likelihood lower than a first threshold likelihood, areas where fractures are likely to exist based on a likelihood greater than a second threshold likelihood, and areas where fracturing is unknown based on a likelihood between the first threshold likelihood and the second threshold likelihood. Machine learning-based estimates of a likelihood of a fracture of each area of the reservoir are determined using machine learning based on mathematical calculations of the seismic data. Fractured and unfractured areas are determined based on where fractures are likely to exist or not using the geomechanically-estimated fractured areas, machine learning-based likelihoods, and Bayes' Rule.

20 Claims, 3 Drawing Sheets

(51) Int. Cl.
   *G06F 30/27*       (2020.01)
   *G06F 111/10*     (2020.01)

(56) References Cited

U.S. PATENT DOCUMENTS

| | | |
|---|---|---|
| 2004/0073370 A1 | 4/2004 | Dasgupta |
| 2009/0303834 A1 | 12/2009 | Sengupta |
| 2013/0238304 A1 | 9/2013 | Glinsky |
| 2014/0233352 A1 | 8/2014 | Kacewicz |
| 2016/0202374 A1 | 7/2016 | Kainkaryam et al. |
| 2016/0320512 A1 | 11/2016 | Zhao |
| 2017/0177764 A1 | 6/2017 | Guy |
| 2017/0285193 A1 | 10/2017 | Zhang et al. |
| 2018/0067220 A1 | 3/2018 | Flemings et al. |
| 2020/0183047 A1 | 6/2020 | Denli et al. |
| 2020/0200931 A1 | 6/2020 | Mao et al. |
| 2020/0278465 A1 | 9/2020 | Salman et al. |
| 2021/0018638 A1 | 1/2021 | Goteti et al. |
| 2021/0125312 A1 | 4/2021 | Mulchandani et al. |

OTHER PUBLICATIONS

Bachrach et al., "Using geomechanical modeling and wide-azimuth data to quantify stress effects and anisotropy near salt bodies in the Gulf of Mexico." In SEG Technical Program Expanded Abstracts 2008, Society of Exploration Geophysicists, 2008, 212-216, 5 pages.

Daly et al., "Multipoint Statistics in Reservoir Modelling and in Computer Vision," Conference Proceedings, EAGE Conference on Petroleum Geostatistics, Sep. 2007, 5 pages.

De Oliveira et al., "Learning Particle Physics by Example: Location-Aware Generative Adversarial Networks for Physics Synthesis," Computing and Software for Big Science, Sep. 2017, 1(4): 1-24, 24 pages.

D'Elia et al., "A tree-structured Markov random filed model for Bayesian image segmentation," IEEE Transactions on Image Processing, 2003, 12:10 (1259-1273), 16 pages.

Durrant-Whyte et al., "Simultaneous Localisation and Mapping (SLAM): Part I The Essential Algorithms, " IEEE Robotics & Automation Magazine, 2006, 13:2 (99-110), 9 pages.

Eidsvik et al., "Stochastic reservoir characterization using prestack seismic data," Geophysics, 2004, 69:4 (978-993), 33 pages.

Guo et al., "Principal component spectral analysis," Geophysics, 2009, 74(4), 9 pages.

Heidari et al., "Coupling geomechanical modeling with seismic pressure prediction." Geophysics 83, No. 5, 2018, 54 pages.

Liu et al., "Auto-painter: Cartoon Image Generation from Sketch by Using Conditional Generative Adversarial Networks, " Neurocomputing, Oct. 2018, 311: 78-87, 31 pages.

Mottle et al., "Pattern recognition in spatial data: A new method of seismic explorations for oil and gas in crystalline basement rocks,"

Proceedings of the 15th International Conference on Pattern Recognition, 2000, 315-318, 4 pages.

Nikolinakou et al., "Pore-pressure prediction based on seismic velocities coupled with geomechanical modeling." In 50th US Rock Mechanics/Geomechanics Symposium. American Rock Mechanics Association, 2016, 8 pages.

Park et al., "Bayesian active learning with localized priors for fast receptive field characterization," Advances in Neural Information Processing Systems, 2012, 25, 9 pages.

Sengupta et al., "Relationship between velocity and anisotropy perturbations and anomalous stress field around salt bodies." The Leading Edge 28, No. 5 (2009), 598-605, 7 pages.

Tavolara et al., "A modular cGAN classification framework: Application to colorectal tumor detection," Scientific Reports, Dec. 2019, 9:18969, 8 pages.

Ulvmoen et al., "Improved resolution in Bayesian lithology/fluid inversion from prestack seisimic data and well observations: Part 1—Methodology," Geophysics, 2010, 75:2 (R21-R35), 15 pages.

Vanpaemel et al., "Constructive informative model priors using hierarchical methods," Journal of Mathematical Psychology, 2010, 55, 106-117, 12 pages.

Wallet et al., "Latent space modeling of seismic data: An overview," The Leading Edge, 2009, 28(12), 6 pages.

Wallet, "3D Modeling of Carbonate Turbidite Channel-forms Using Curvature: A Workflow," SEG Technical Program Expanded Abstracts, 2015, 2 pages.

Wallet, "Using the image grand tour to visualize fluvial deltaic architectural elements in south Texas, USA," Interpretation, 2013, 1(1), 13 pages.

Wang, "Image Denoising Using Deep CGAN With Bi-Skip Connections," Proceedings of the IEEE/CVF Conference on Computer Vision and Pattern Recognition (CVPR) Workshops, 2019, pp. 724-729, 6 pages.

Woolrich et al., "Variational Bayes inference of spatial mixture models for segmentation," IEEE Transactions on Medical Imaging, 2006, 25(10): 1380-1391, 12 pages.

Xu et al., "Prediction-CGAN: Human Action Prediction with Conditional Generative Adversarial Networks," Proceedings of the 27th ACM International Conference on Multimedia, Oct. 2019, pp. 611-619, 9 pages.

Zee et al., "3D geomechanical modeling of complex salt structures." In SIMULIA Customer Conference. 2011, 16 pages.

Zhang et al., "Segmentation of brain MR images through a hidden Markov random field model and the expectation-maximization algorithm," IEEE Transactions on Medical Imagining, 2001, 20:1, 13 pages.

PCT International Search Report and Written Opinion in International Appln. No. PCT/US2022/014341, dated Jun. 1, 2022, 18 pages.

Lefranc et al., "Fractured Basement Reservoir Characterization for Fracture Distribution, Porosity and Permeability Prediction," Adapted from extended abstract prepared in conjunction with oral presentation at AAPG International Conference and Exhibition, Singapore, Sep. 16-19, 2012, 1-23.

100

200

300

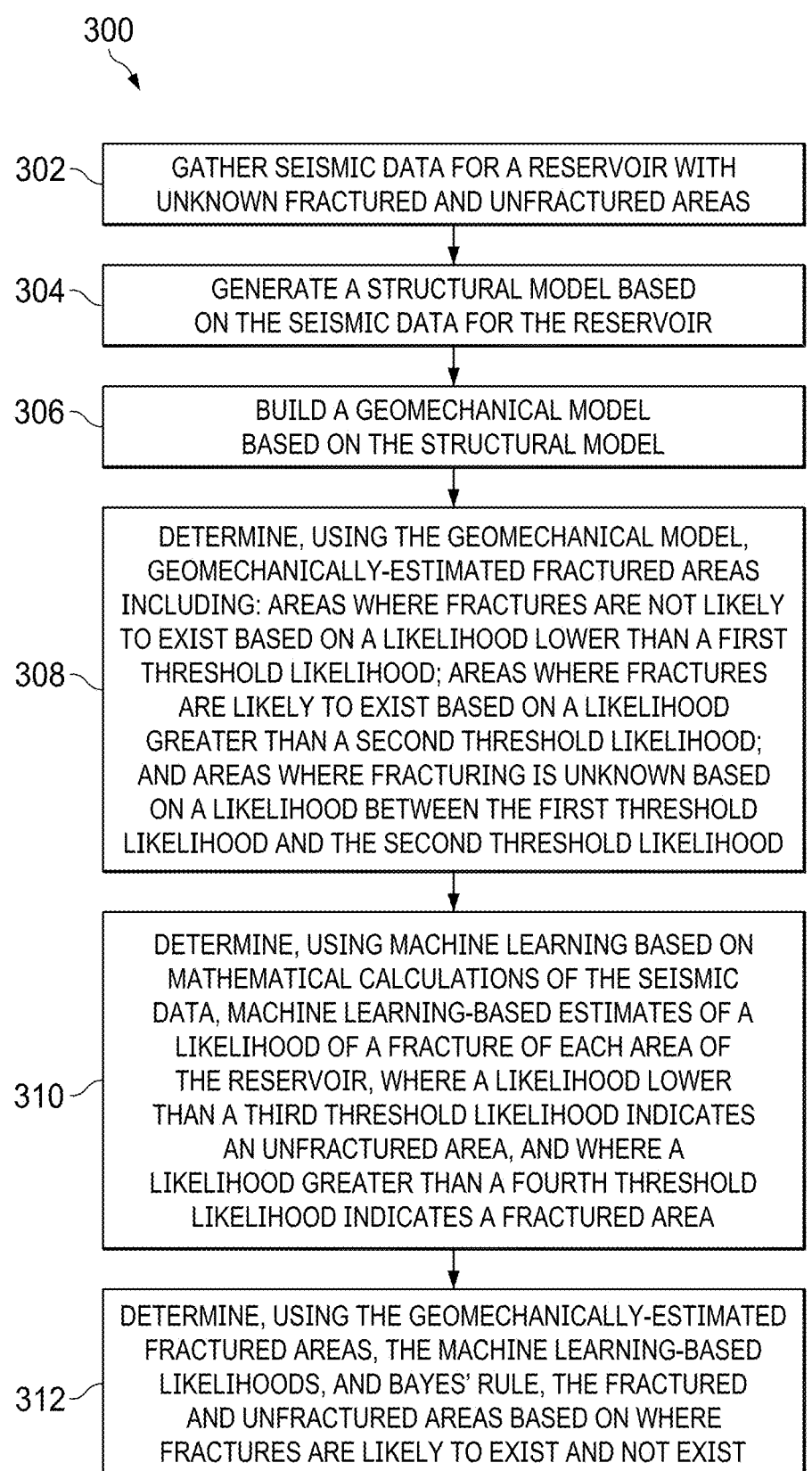

302 — GATHER SEISMIC DATA FOR A RESERVOIR WITH UNKNOWN FRACTURED AND UNFRACTURED AREAS

304 — GENERATE A STRUCTURAL MODEL BASED ON THE SEISMIC DATA FOR THE RESERVOIR

306 — BUILD A GEOMECHANICAL MODEL BASED ON THE STRUCTURAL MODEL

308 — DETERMINE, USING THE GEOMECHANICAL MODEL, GEOMECHANICALLY-ESTIMATED FRACTURED AREAS INCLUDING: AREAS WHERE FRACTURES ARE NOT LIKELY TO EXIST BASED ON A LIKELIHOOD LOWER THAN A FIRST THRESHOLD LIKELIHOOD; AREAS WHERE FRACTURES ARE LIKELY TO EXIST BASED ON A LIKELIHOOD GREATER THAN A SECOND THRESHOLD LIKELIHOOD; AND AREAS WHERE FRACTURING IS UNKNOWN BASED ON A LIKELIHOOD BETWEEN THE FIRST THRESHOLD LIKELIHOOD AND THE SECOND THRESHOLD LIKELIHOOD

310 — DETERMINE, USING MACHINE LEARNING BASED ON MATHEMATICAL CALCULATIONS OF THE SEISMIC DATA, MACHINE LEARNING-BASED ESTIMATES OF A LIKELIHOOD OF A FRACTURE OF EACH AREA OF THE RESERVOIR, WHERE A LIKELIHOOD LOWER THAN A THIRD THRESHOLD LIKELIHOOD INDICATES AN UNFRACTURED AREA, AND WHERE A LIKELIHOOD GREATER THAN A FOURTH THRESHOLD LIKELIHOOD INDICATES A FRACTURED AREA

312 — DETERMINE, USING THE GEOMECHANICALLY-ESTIMATED FRACTURED AREAS, THE MACHINE LEARNING-BASED LIKELIHOODS, AND BAYES' RULE, THE FRACTURED AND UNFRACTURED AREAS BASED ON WHERE FRACTURES ARE LIKELY TO EXIST AND NOT EXIST

FIG. 3

MACHINE LEARNING OF GEOLOGY BY PROBABILISTIC INTEGRATION OF LOCAL CONSTRAINTS

CROSS-REFERENCE TO RELATED APPLICATIONS

This application is a conversion of Provisional Application No. 63/143,712, filed on Jan. 29, 2021, and is hereby incorporated by reference in its entirety.

BACKGROUND

The present disclosure applies to techniques used to improve the outcome of machine learning.

Machine learning is an increasingly established method of estimating some unknown state of nature given a training sample of data. The training sample typically consists of data observations along with associated class information. From this data set, a model is then constructed that predicts unknown class membership for future observations. A problem often arises when one class is rare relative to other classes in nature. Whether due to this rare class being deliberately sought or disproportionately sought in the data acquisition process, or due to the necessity of including a disproportionate number of the rare class to ensure proper modeling of the implicit probability density function, rare classes are often over-represented in training samples. This over-representation, or sampling bias, leads to a model that is more likely to predict rare classes than is warranted because the rare classes are over-represented in the model building process.

SUMMARY

The present disclosure describes techniques that can be used in techniques used to improve the outcome of machine learning. In some implementations, a computer-implemented method includes the following. Seismic data is gathered for a reservoir with unknown fractured and unfractured areas. A structural model is generated based on the seismic data for the reservoir. A geomechanical model is built based on the structural model. Geomechanically-estimated fractured areas are determined using the geomechanical model, including: areas where fractures are not likely to exist based on a likelihood lower than a first threshold likelihood, areas where fractures are likely to exist based on a likelihood greater than a second threshold likelihood, and areas where fracturing is unknown based on a likelihood between the first threshold likelihood and the second threshold likelihood. Machine learning-based estimates of a likelihood of a fracture of each area of the reservoir are determined using machine learning based on mathematical calculations of the seismic data, where a likelihood lower than a third threshold likelihood indicates an unfractured area, and where a likelihood greater than a fourth threshold likelihood indicates a fractured area. Fractured and unfractured areas based on where fractures are likely to exist and not exist are determined using the geomechanically-estimated fractured areas, the machine learning-based likelihoods, and Bayes' Rule.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, the techniques of the present disclosure can be used to compensate for the over-representation, or sampling bias, in models that are more likely to predict rare classes than is warranted because the rare classes are over-represented in the model-building process. Second, a geomechanical estimate of fracture can be combined with machine learning based on predictions using Bayes' Rule to decide whether an area is fractured or unfractured.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 3 is a flowchart of an example of a method for determining where fractures are likely to exist, according to some implementations of the present disclosure.

Like reference numbers and designations in the various drawings indicate like elements.

DETAILED DESCRIPTION

Figure 1:
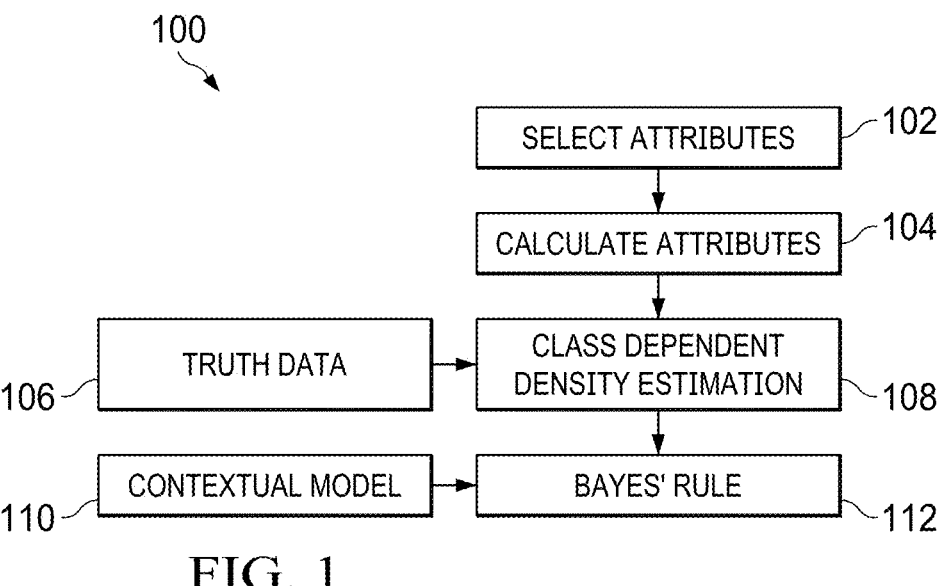
FIG. 1 is a block diagram showing an example of an integrated workflow for combining a geomechanical estimate of fracture with machine learning, according to some implementations of the present disclosure.

The following detailed description describes techniques used to improve the outcome of machine learning. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

One way of dealing with this bias of rare classes being over-represented in the model building process is to explicitly scale for expected relative proportions. Bayesian methods apply a scaling based upon a prior belief or distribution. Typically, the application of so-called prior information is done uniformly across all samples in the model. Less common methods may perform scaling based upon some other previous information.

The baseline method of doing Bayesian analysis is based upon an equation, Bayes' Equation. A description of mathematics that follows provides background information. Bayesian methods take some prior information about a probability and then update the probability based upon observations. Historically, this approach fell into two possibilities. One was to just assume no prior information exists. This sounds pointless, but it has some mathematical properties that can be considered nice. This is very common since formulating prior knowledge can be an intractable problem. The other method is to use a generic prior knowledge for all observations. For instance, consider trying to estimate the probability that a well will be economic. It might be said that, historically, 80% of wells have been economic. Then, the probability for an individual well can be updated based upon some observations of the seismic information.

Techniques of the current disclosure can include updating the algorithm by substituting, for each observation, a specific probability for that observation based upon some model. In the current example, the probability of fractures can be calculated for every point in the reservoir based upon a geomechanical model. Unlike conventional techniques that might assume that 10% of the reservoir is fractured based upon previous history, techniques of the current disclosure can provide a probability for each position in the reservoir. Then, using Bayes' Equation, the probability can be conditioned (updated) based upon the observed seismic data.

At a simplified high level, techniques of the present disclosure can include a process for integrating information based upon a well-known mathematical method, Bayes' Rule. Bayes' Rule is a mathematical way of saying that the likelihood that something will happen is based upon prior experience. For example, something is observed. Then a decision is based upon what happened by combining the observation and prior experience. In a specific example, engineers may want to know what parts of a reservoir are fractured. Suppose that based upon prior work, it is believed that 20% of the reservoir is fractured. That means that, if seismic data is gathered and analyzed, and it is unknown whether a particular part is fractured (for example, a 50/50 chance), then it can be assumed that the particular part is not fractured. This is because it is known that the reservoir is mostly unfractured (only 20% likely). So if observations are used from seismic data alone, and if the observation is unsure based upon the seismic data, then there is no reason to move away from the prior assumptions (that a particular location is most likely unfractured). In effect, it is believed that any one location is unfractured, so the seismic data needs to be convincing to overrule the assumption. Conversely, if the prior belief is that 80% of the reservoir is fractured, then evidence is needed to suggest that a particular region is not fractured. If it is unknown or that believed fractured/unfractured is equally likely, then the process devolves into just looking at the seismic data without any tendency. This is the canonical way of doing things. In this case, instead of using some general prior belief, a decision can be based upon another piece of information.

In some implementations, a decision process can include the following. First, seismic data is gathered. Second, a structural model is generated. Third, the structural model is used to build a geomechanical model. Fourth, the geomechanical model is used to estimate where fractures are more likely or less likely to exist. Fifth, based upon the mathematical calculations of the seismic data (not using geomechanics), machine learning can be used to estimate how likely each part of the reservoir is to be fractured. Sixth, the geomechanical estimate of fracture is combined with the machine learning based on predictions using Bayes' Rule. If geomechanics says a location is likely to be fractured and the seismic is ambiguous, then a fracture decision is made. If geomechanics is ambiguous and the machine learning model is sure, then a fracture decision is made. If the information is contradictory or both are ambiguous, and unsure decision is made. This is different than the canonical method which would use a general, reservoir-wide prior belief system. This sixth step is a focus of the present disclosure.

Some implementations of the present disclosure can include the direct calculation of probabilities based on Equation (1). The equation takes the probability of each of two observations and integrates the probabilities to obtain a unified probability. In some implementations, Equation (1) can be chained with other inputs (for example, probabilities) to obtain the probability based on three or more observations.

Calculations may or may not involve the use of a look-up table. In some implementations, a look-up table can be implemented as a 3-by-3 table of No, Ambiguous, and Yes. In some implementations, a look-up table can be implemented as a 5-by-5 table of Very Unlikely, Unlikely, Ambiguous, Likely, and Very Unlikely. Look-up tables can be of different sizes, and the sizes can be symmetrical or asymmetrical (for example, 3-by-5). Different levels of look-up tables can be determined by taking criteria, not necessarily probabilities as dictated in Equation (1), and applying thresholds.

Regarding the mathematics involved in the present disclosure, Bayes' theorem provides a method for scaling probabilities based on some prior belief or knowledge about a system formed before the presence of a data observation. In its basic form, Bayes' theorem is given as:

$$pr(a|b) = \frac{pr(b|a)pr(a)}{pr(b)} \qquad (1)$$

where a is an event of interest, b is an observation, pr(a|b) is the likelihood of an event given an observation, pr(b|a) is the likelihood of an observation given an event, pr(a) is the likelihood of an event, and pr(b) is the likelihood of an observation.

In some implementations, pr(b) is a normalization factor that can be expressed as:

$$pr(b) = \Sigma_A pr(b|a)pr(a) \qquad (2)$$

where A is the set of all possible events.

Since events are generally discrete, pr(a|b) and pr(a) can generally be referred to as probabilities, since the measure of their integration is a counting measure, and hence a single value can have an integrated value greater than 0. Also, pr(a) can generally be referred to as the prior or prior belief, since it represents a probability of an event prior to an observation. Further, pr(a|b) is frequently referred to as the posterior belief, as it represents a probability of an event after an observation.

Prior beliefs are generally expressed in a relatively simple manner. For example, if 10% of a reservoir is fractured, then pr(fractured)=0.1 and pr(not fractured)=0.9. The prior distribution in this case would thus be a binomial distribution with the more general case of more than two classes having a multinomial distribution. This simplistic approach is generally used because data is present without any context. For instance, when attempting to classify a radar signal as being of a T-72 tank or a BTR-80 armored personnel carrier, the radar signal likely constitutes the entirety of the available information.

FIG. 1 is a block diagram showing an example of an integrated workflow 100 for combining a geomechanical estimate of fracture with machine learning, according to some implementations of the present disclosure. For example, the workflow 100 can make it possible to combine traditional seismic attribute analysis with machine learning. The workflow 100 can be used when dealing with issues of reservoir properties, such as the presence of fractures, in which it is possible to construct a machine learning process based a model that predicts the feature of interest. The workflow 100 can be used to overcome issues associated with selection bias, which is not typically addressed when using machine learning techniques applied to hydrocarbon exploration.

At 102 attributes, such as seismic attributes, are selected from seismic data. An attribute can be a feature of interest, such as whether a location is fractured or not. At 104, the attributes can be calculated or derived from seismic data, for example, if not already available in the seismic data.

At 106, "truth data" about the feature of interest is typically provided by human interpretation of either well data or a limited interpretation of the available seismic data. At 108, a class dependent density estimation is made.

At this point in the workflow 100, a naïve approach would be to use some form of Bayes' rule as previously described, while incorporating an estimated prevalence of the features of interest across the reservoir. This approach may partially correct for selection bias. However, the approach of the present disclosure is to use a contextual model at 110 that is also used with Bayes' rule at 112. The contextual model includes the use of a context aware prior distribution that varies spatially based upon geomechanics, deposition, and other estimable, domain information about the reservoir. For the sake of illustration, assume the set of events, A={frac, notfrac}, and the reservoir model, $\xi$, is a geomechanical model of stress and strain based upon seismic interpretation. Then, the probability of fractured rock at a location X can be expressed as:

$$pr(frac_X) = \frac{pr(x_X|frac)pr(frac|\xi_X)}{pr(x_X|frac)pr(frac|\xi_X) + pr(x_X|notfrac)pr(frac|\xi_X)} \quad (3)$$

This use of the contextualized prior probability of fractured rock, $pr(frac|\xi_X)$, is an essential part of the present disclosure. As such, the traditional binomial prior distribution has been replaced with a geomechanically aware prior distribution.

One requirement of Bayes' rule is the knowledge of the statistical distribution or probability density function (PDF) of an observable, given an event, such as $pr(x_X|frac)$ in the current example. Traditionally, in the field of statistical machine learning, this was considered a strength as opposed to the use of the Neyman-Pearson lemma on which traditional statistical hypothesis testing is based. Rather than a ratio of likelihoods, Bayes' rule gives a probability which is useful in risk analysis and more understandable to a human interpreter.

In contrast, traditional seismic attribute analysis, ad hoc thresholding of discriminate values is typically used. This removes the necessity of estimation of PDF's (density estimation). One resulting advantage of thresholding is the removal of a complicated process. The disadvantage of thresholding is that it is not quantitative in nature. Risk is implicit in the manual decision by an interpreter in where to place the threshold.

Note that the calculated attribute nomenclature can include dimensionality reduced aggregates from methods that include, for example, principal component analysis and latent space analysis. While the techniques of the present disclosure provide a good and valid workflow, the proliferation of many other forms of machine learning based classification should also be noted. Other forms of machine learning of particular interest in recent years include deep learning methods, including seismic applications such as convolutional neural networks (CNN). Such methods frequently perform a soft classification of data, assigning a number from zero to one for each class in regards to each observation. Typically, the sum across all classes is taken to be one, though the values can be re-normalized if not. While these numbers are not truly probabilities of class membership, they are often taken to be such. Such a method can be subject to selection bias if the distribution of training samples is not indicative of the actual distribution of class memberships. This can also be thought of as the results of Bayesian analysis with what is called an uninformative prior.

Consider a classifier, r(x) that given an observation of seismic data, x, such that x→g where g is a two-dimensional vector such that $g_1+g_2=1$. As such, $g_1$ is taken to be the probability that x represents fractured rock, and $g_2=1-g_1$ is the probability that x represents unfractured rock given an assumption that each event is equally likely. As such, a "prior adjusted" probability can be loosely defined as:

$$pr(frac|g)=g_1 pr(frac|\xi_X) \quad (4)$$

and $$pr(frac|g)=g_2 pr(notfrac|\xi_X) \quad (5)$$

However, the sum of the values over all events (frac, no frac) would not be equal to one, and thus this would not be a true probability. Therefore, the adjusted probability function that is used can be:

$$pr(frac|g) = \frac{g_1 pr(frac|\xi_X)}{g_1 pr(frac|\xi_X) + g_2 pr(notfrac|\xi_X)} \quad (6)$$

If it is assumed that g is equivalent to Bayes' rule with non-informative priors, Equation (6) can be obtained through common derivation.

Experimental Data, Processing Steps, and Results

In order to demonstrate the functioning and utility to the method described in the present disclosure, a series of mathematical simulations were undertaken. Two classes, $g_1$ and $g_2$, were defined. Without loss of generality, the two classes can be referred to as fractured and unfractured. Then, a simulated seismic attribute, X, can be defined. When rock is unfractured, $X_{notfrac}$~N(0,1), and when rock is fractured, $X_{frac}$~N(1,1). Then, 108 samples of each class were realized. It was assumed that the distributions associated with each class were known. Then, each sample was classified based on the class yielding the maximum likelihood of the observed attribute. This corresponds to a hypothesis using the Neyman-Pearson Lemma of a null hypothesis of unfractured and an α-level of 0.5. In doing this, the following confusion matrix can be obtained:

TABLE 1

| Confusion Matrix | | |
| --- | --- | --- |
| | Unfractured | Fractured |
| Unfractured | 0.692 | 0.308 |
| Fractured | 0.308 | 0.692 |

In the matrix, the rows represent the actual class, and the columns represent the estimated class.

Next, a prior probability of 0.8 for unfractured and 0.2 for fractured were assumed. Using the same data in the previous experiment, a posterior probability was calculated using Bayes' rule, and classified based upon the most probable class. In doing this, the following confusion matrix was obtained:

TABLE 2

| Confusion Matrix | | |
| --- | --- | --- |
| | Unfractured | Fractured |
| Unfractured | 0.970 | 0.030 |
| Fractured | 0.812 | 0.188 |

While this method greatly increased performance in detecting unfractured rock, it significantly degraded the ability to detect fractured rock. This is because the prior expectation of the rock being unfractured is so significant, as it takes significant evidence to overcome this belief. Overall, this will increase the number of correct answers, but it will not lead to a model that is good at detecting fractured rock. Note that under the stated assumptions, always choosing to classify as unfractured will correctly classify 0.8 of the rocks, including all of the unfractured rock, though none of the fractured rock would be correctly labeled as such.

Finally, it was assumed that the model could generate prior probabilities. Without loss of generality, the model can be called a geomechanical model. This model can be assumed to be 0.9 accurate. Then, variable prior information in Bayes' rule can be used for classification based upon the most probable answer. In doing this, the following confusion matrix can be obtained:

TABLE 3

| Confusion Matrix | | |
| --- | --- | --- |
| | Unfractured | Fractured |
| Unfractured | 0.996 | 0.004 |
| Fractured | 0.004 | 0.996 |

Note that incorporating geomechanical information significantly improves performance over using only seismic data. Also note that incorporating seismic data significantly improves performance over using only the geomechanical information.

Techniques of the present disclosure were tested using a pilot geomechanical model of a real-world outcrop field data set the Hernandez relay zone (HRZ) in the Rio Grande rift, in North-central New Mexico. Relay zones in such extensional tectonics settings include the intervening rock volume between adjacent echelon normal fault segments. The relay zones accommodate the strain transfer between adjacent normal fault segments through a complex combination of rotational and distortional strains. As a result, basic principles of Andersonian mechanics based on an irrotational strain field cannot be applied to understand or predict the locations of fractures in relay zones. Because of the three-dimensional (3D) displacement field within the relay zone, the stress regime evolves along a complex manner resulting in fracture sets of various ages, orientations, and intensities. Quantitative prediction of this complex 3D strain field using geometric or analytical techniques, and using those predictions as a geomechanical prior, is extremely challenging if not impossible. 3D geomechanical forward models can be used in investigating the evolution of these rotational strains as a function of rock properties, fault proximity, and tectonic loading. The 3D geomechanical forward models can also provide a platform to map the fracture likelihood using a process-based (in this case geomechanics) approach.

The Hernandez relay zone (HRZ) was chosen for this study owing to excellent exposures of multiple generations of fracture sets and veins that are often exposed on two faces parallel to and perpendicular to the bedding surface. From selected outcrops, the variations in the intensity and orientations of mesoscopic fracture sets were mapped in detail. Also mapped were other strain features, such as veins both within and outside the HRZ. Mutually cross-cutting relationships observed in the field were used to identify conjugate fracture sets of various generations and attendant evolution of the maximum extensional strain orientation. Similarly, cross-cutting relationships between different sets of veins were used to infer changes in the orientations of the maximum extensional strain with the evolution of the HRZ. The term "fractures" is used to indicate both the veins and shear fractures observed in the HRZ, and to demonstrate the capability of geomechanical models to spatially predict fracture orientations and intensities. In this pilot study, a 3D non-linear elastic-plastic finite element model of the HRZ was developed. The model included frictional faults and inelastic relay zone properties which are representative of the real rocks exposed in the HRZ. The tectonic loading in the geomechanical models was constrained by field observations of geometry and likely the burial depth of HRZ during its deformation. The predictions of the geomechanical model are consistent with field observations of: 1) high-fracture densities within HRZ compared to rocks outside the relay zone, and 2) orientations of the fractures and veins within the HRZ as a function of their structural position. These results provided confidence in using geomechanical models for providing a predictive mechanical framework for the formation of fractures in the HRZ. Given the commonality of deformation field in geological structures at multiple scales, such geomechanical models can be used to predict the location of geological structures at different scales while taking into account the structural position and rock properties. The multiple scales can range from millimeter (mm) to kilometer (km) scales, for example.

Because appropriate accompanying seismic data did not exist, seismic attributes were simulated to accompany the constructed geomechanical model. A series of fracture maps were generated using the probabilities from the geomechanical model. For each simulated reservoir, a simulated seismic attribute was generated with unfractured rock having a normal distribution with a zero mean and a variance of one, and fractured rock having a normal distribution with a mean of one and a variance of one. The method of the present disclosure was then applied to map the fractured rock.

Note that while the seismic attributes are simulated at this point, the geomechanical model is considered real in this analysis. Using this method, a Monte Carlo analysis of the method was performed using a 3D geomechanical model of real rocks.

Figure 2:
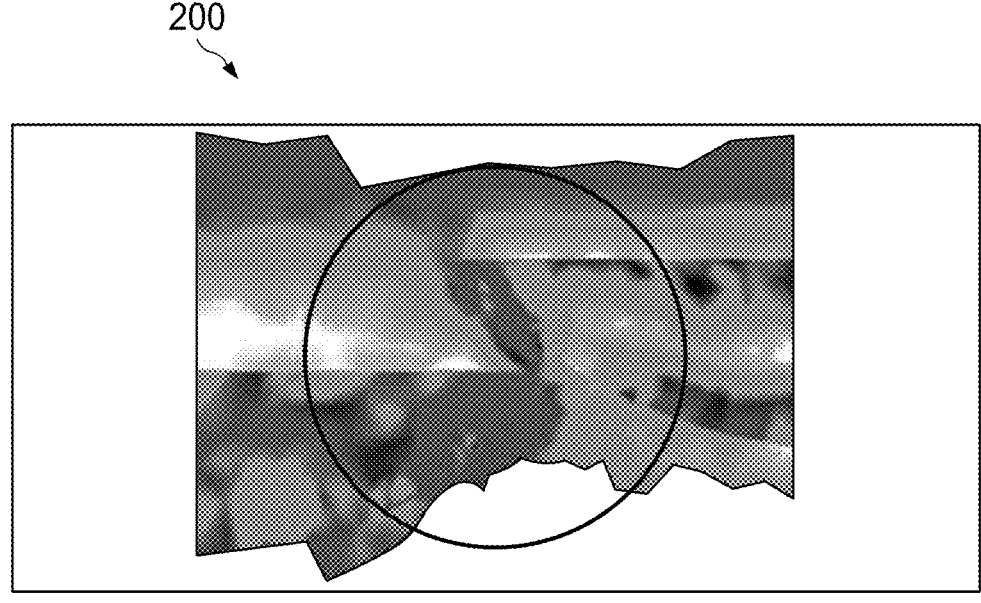
FIG. 2 is a map diagram showing an example of a probability of fracture map, according to some implementations of the present disclosure.

FIG. 2 is a map diagram showing an example of a probability of fracture map 200, according to some implementations of the present disclosure. Blue areas in the fracture map 200 represent lower probabilities of fracture. Red areas in the fracture map 200 represent lower probabilities of fracture. This model was generated using a geological data from the Hernandez relay zone (HRZ) in the Rio Grande rift, in North-central New Mexico as discussed above. Using this probability map, 1000 simulated reservoirs were then generated with fractures being stochastically modeled.

Running 1,000 Monte Carlo simulations provided the following results:

TABLE 4

| Simulation Results | | |
| --- | --- | --- |
| | Fraction correctly classified (mean) | Standard Error |
| Fractured (Neyman-Pearson) | 0.692 | 0.000533 |
| Unfractured (Neyman-Pearson) | 0.692 | 0.000723 |
| Fractured (our method) | 0.906 | 0.000325 |
| Unfractured (our method) | 0.898 | 0.000735 |

These results are based upon the assumptions of the model. Also, due to the nature of the sampling of the geomechanical modeling method that was used, fractured rock was over-represented in the samples. This resulted in a lower standard error for the fracture rocks. However, this study clearly demonstrates the validity of the approach.

FIG. 3 is a flowchart of an example of a method 300 for determining where fractures are likely to exist, according to some implementations of the present disclosure. For example, determining where fractures are likely to exist includes using geomechanically-estimated fractured areas, the machine learning-based estimates, and Bayes' Rule. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 302, seismic data is gathered for a reservoir with unknown fractured and unfractured areas. From 302, method 300 proceeds to 304.

At 304, a structural model is generated based on the seismic data for the reservoir. From 304, method 300 proceeds to 306.

At 306, a geomechanical model is built based on the structural model. From 306, method 300 proceeds to 308.

At 308, geomechanically-estimated fractured areas are determined using the geomechanical model, including: areas where fractures are not likely to exist based on a likelihood lower than a first threshold likelihood, areas where fractures are likely to exist based on a likelihood greater than a second threshold likelihood, and areas where fracturing is unknown based on a likelihood between the first threshold likelihood and the second threshold likelihood. From 308, method 300 proceeds to 310.

At 310, machine learning-based estimates of a likelihood of a fracture of each area of the reservoir are determined using machine learning based on mathematical calculations of the seismic data, where a likelihood lower than a third threshold likelihood indicates an unfractured area, and where a likelihood greater than a fourth threshold likelihood indicates a fractured area. From 310, method 300 proceeds to 312.

At 312, fractured and unfractured areas based on where fractures are likely to exist and not exist are determined using the geomechanically-estimated fractured areas, the machine learning-based likelihoods, and Bayes' Rule. After 312, method 300 can stop.

Figure 4:
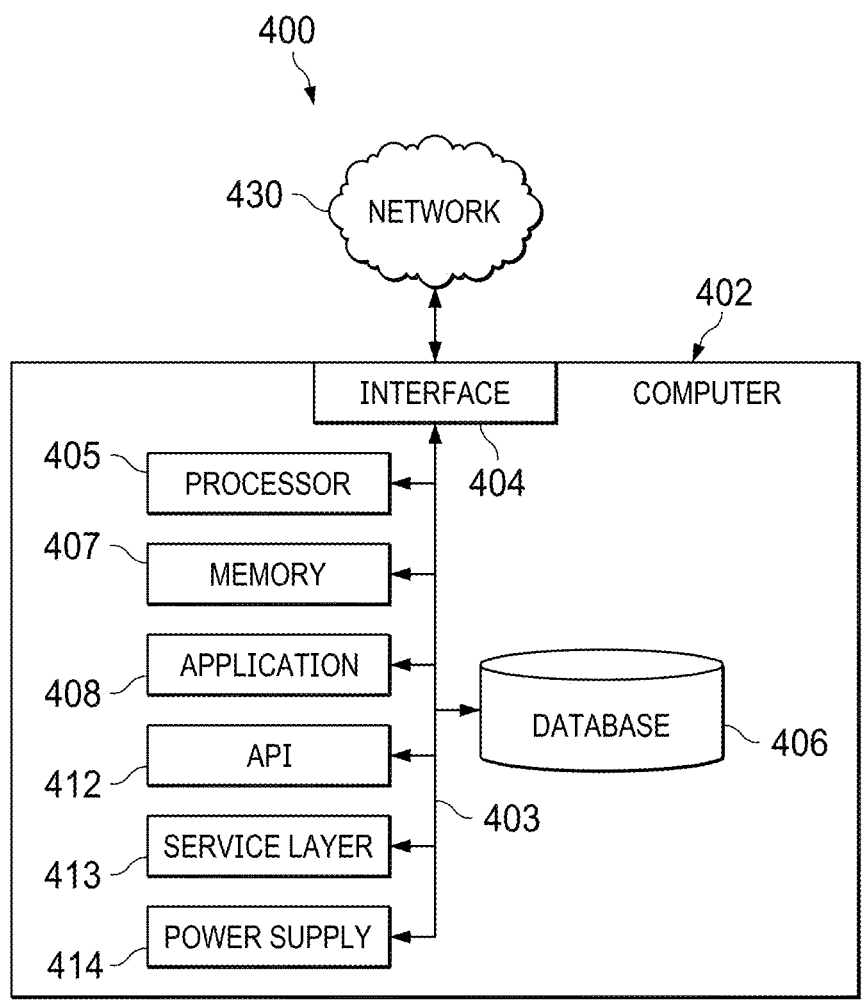
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a top level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both) over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method includes the following. Seismic data is gathered for a reservoir with unknown fractured and unfractured areas. A structural model is generated based on the seismic data for the reservoir. A geomechanical model is built based on the structural model. Geomechanically-estimated fractured areas are determined using the geomechanical model, including: areas where fractures are not likely to exist based on a likelihood lower than a first threshold likelihood, areas where fractures are likely to exist based on a likelihood greater than a second threshold likelihood, and areas where fracturing is unknown based on a likelihood between the first threshold likelihood and the second threshold likelihood. Machine learning-based estimates of a likelihood of a fracture of each area of the reservoir are determined using machine learning based on mathematical calculations of the seismic data, where a likelihood lower than a third threshold likelihood indicates an unfractured area, and where a likelihood greater than a fourth threshold likelihood indicates a fractured area. Fractured and unfractured areas based on where fractures are likely to exist and not exist are determined using the geomechanically-estimated fractured areas, the machine learning-based likelihoods, and Bayes' Rule.

The foregoing and other described implementations can each, optionally, include one or more of the following features:

A first feature, combinable with any of the following features, where determining where fractures are likely to exist comprises determining that a fracture exists when: the geomechanical model indicates a likelihood greater than the second threshold likelihood; and the seismic data includes a likelihood between a third threshold likelihood and a fourth threshold likelihood.

A second feature, combinable with any of the previous or following features, where determining where fractures are likely to exist comprises determining that a fracture exists when: the geomechanical model indicates a likelihood within a range of the first threshold likelihood and the second threshold likelihood; and the seismic data includes a likelihood greater than the fourth threshold likelihood.

A third feature, combinable with any of the previous or following features, where determining where fractures are likely to exist comprises determining that an existence of a fracture is unsure when: the geomechanical model indicates a likelihood less than the second threshold likelihood; or the seismic data includes a likelihood less than a third threshold likelihood.

A fourth feature, combinable with any of the previous or following features, where determining where fractures are likely to exist comprises using a 3-by-3 look-up table with fracture likelihoods of No, Ambiguous, and Yes.

A fifth feature, combinable with any of the previous or following features, where determining where fractures are likely to exist comprises using a 5-by-5 look-up table with fracture likelihoods of Very Unlikely, Unlikely, Ambiguous, Likely, and Very Unlikely.

A sixth feature, combinable with any of the previous or following features, where determining where fractures are likely to exist comprises using an asymmetric look-up table that bases fracture likelihood combinations on one or both of criteria and probabilities and an application of one or more thresholds.

In a second implementation, a non-transitory, computer-readable medium stores one or more instructions executable by a computer system to perform operations including the following. Seismic data is gathered for a reservoir with unknown fractured and unfractured areas. A structural model is generated based on the seismic data for the reservoir. A geomechanical model is built based on the structural model. Geomechanically-estimated fractured areas are determined using the geomechanical model, including: areas where fractures are not likely to exist based on a likelihood lower than a first threshold likelihood, areas where fractures are likely to exist based on a likelihood greater than a second threshold likelihood, and areas where fracturing is unknown based on a likelihood between the first threshold likelihood and the second threshold likelihood. Machine learning-based estimates of a likelihood of a fracture of each area of the reservoir are determined using machine learning based on mathematical calculations of the seismic data, where a likelihood lower than a third threshold likelihood indicates an unfractured area, and where a likelihood greater than a fourth threshold likelihood indicates a fractured area. Fractured and unfractured areas based on where fractures are likely to exist and not exist are determined using the geomechanically-estimated fractured areas, the machine learning-based likelihoods, and Bayes' Rule.

The foregoing and other described implementations can each, optionally, include one or more of the following features:

A first feature, combinable with any of the following features, where determining where fractures are likely to exist comprises determining that a fracture exists when: the geomechanical model indicates a likelihood greater than the second threshold likelihood; and the seismic data includes a likelihood between a third threshold likelihood and a fourth threshold likelihood.

A second feature, combinable with any of the previous or following features, where determining where fractures are likely to exist comprises determining that a fracture exists when: the geomechanical model indicates a likelihood within a range of the first threshold likelihood and the second threshold likelihood; and the seismic data includes a likelihood greater than the fourth threshold likelihood.

A third feature, combinable with any of the previous or following features, where determining where fractures are likely to exist comprises determining that an existence of a fracture is unsure when: the geomechanical model indicates a likelihood less than the second threshold likelihood; or the seismic data includes a likelihood less than a third threshold likelihood.

A fourth feature, combinable with any of the previous or following features, where determining where fractures are likely to exist comprises using a 3-by-3 look-up table with fracture likelihoods of No, Ambiguous, and Yes.

A fifth feature, combinable with any of the previous or following features, where determining where fractures are likely to exist comprises using a 5-by-5 look-up table with fracture likelihoods of Very Unlikely, Unlikely, Ambiguous, Likely, and Very Unlikely.

A sixth feature, combinable with any of the previous or following features, where determining where fractures are likely to exist comprises using an asymmetric look-up table that bases fracture likelihood combinations on one or both of criteria and probabilities and an application of one or more thresholds.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Seismic data is gathered for a reservoir with unknown fractured and unfractured areas. A structural model is generated based on the seismic data for the reservoir. A geomechanical model is built based on the structural model. Geomechanically-estimated fractured areas are determined using the geomechanical model, including: areas where fractures are not likely to exist based on a likelihood lower than a first threshold likelihood, areas where fractures are likely to exist based on a likelihood greater than a second threshold likelihood, and areas where fracturing is unknown based on a likelihood between the first threshold likelihood and the second threshold likelihood. Machine learning-based estimates of a likelihood of a fracture of each area of the reservoir are determined using machine learning based on mathematical calculations of the seismic data, where a likelihood lower than a third threshold likelihood indicates an unfractured area, and where a likelihood greater than a fourth threshold likelihood indicates a fractured area. Fractured and unfractured areas based on where fractures are likely to exist and not exist are determined using the geomechanically-estimated fractured areas, the machine learning-based likelihoods, and Bayes' Rule.

The foregoing and other described implementations can each, optionally, include one or more of the following features:

A first feature, combinable with any of the following features, where determining where fractures are likely to exist comprises determining that a fracture exists when: the geomechanical model indicates a likelihood greater than the second threshold likelihood; and the seismic data includes a likelihood between a third threshold likelihood and a fourth threshold likelihood.

A second feature, combinable with any of the previous or following features, where determining where fractures are likely to exist comprises determining that a fracture exists when: the geomechanical model indicates a likelihood within a range of the first threshold likelihood and the second threshold likelihood; and the seismic data includes a likelihood greater than the fourth threshold likelihood.

A third feature, combinable with any of the previous or following features, where determining where fractures are likely to exist comprises determining that an existence of a fracture is unsure when: the geomechanical model indicates a likelihood less than the second threshold likelihood; or the seismic data includes a likelihood less than a third threshold likelihood.

A fourth feature, combinable with any of the previous or following features, where determining where fractures are likely to exist comprises using a 3-by-3 look-up table with fracture likelihoods of No, Ambiguous, and Yes.

A fifth feature, combinable with any of the previous or following features, where determining where fractures are likely to exist comprises using a 5-by-5 look-up table with fracture likelihoods of Very Unlikely, Unlikely, Ambiguous, Likely, and Very Unlikely.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/nonpermanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
gathering seismic data for a reservoir with unknown fractured and unfractured areas;
generating a structural model based on the seismic data for the reservoir;
building a geomechanical model based on the structural model;
determining, using the geomechanical model, geomechanically-estimated fractured areas including: areas where fractures are not likely to exist based on a likelihood lower than a first threshold likelihood; areas where fractures are likely to exist based on a likelihood greater than a second threshold likelihood; and areas where fracturing is unknown based on a likelihood between the first threshold likelihood and the second threshold likelihood;
determining, using machine learning based on mathematical calculations of the seismic data, machine learning-based estimates of a likelihood of a fracture of each area of the reservoir, wherein a likelihood lower than a third threshold likelihood indicates an unfractured area, and wherein a likelihood greater than a fourth threshold likelihood indicates a fractured area; and
determining, using the geomechanically-estimated fractured areas, the machine learning-based likelihoods, and Bayes' Rule, the fractured and unfractured areas based on where fractures are likely to exist and not exist.

2. The computer-implemented method of claim 1, wherein determining where fractures are likely to exist comprises determining that a fracture exists when:
the geomechanical model indicates a likelihood greater than the second threshold likelihood; and
the seismic data includes a likelihood between a third threshold likelihood and a fourth threshold likelihood.

3. The computer-implemented method of claim 1, wherein determining where fractures are likely to exist comprises determining that a fracture exists when:
the geomechanical model indicates a likelihood within a range of the first threshold likelihood and the second threshold likelihood; and
the seismic data includes a likelihood greater than the fourth threshold likelihood.

4. The computer-implemented method of claim 1, wherein determining where fractures are likely to exist comprises determining that an existence of a fracture is unsure when:
the geomechanical model indicates a likelihood less than the second threshold likelihood; or
the seismic data includes a likelihood less than a third threshold likelihood.

5. The computer-implemented method of claim 1, wherein determining where fractures are likely to exist comprises using a 3-by-3 look-up table with fracture likelihoods of No, Ambiguous, and Yes.

6. The computer-implemented method of claim 1, wherein determining where fractures are likely to exist comprises using a 5-by-5 look-up table with fracture likelihoods of Very Unlikely, Unlikely, Ambiguous, Likely, and Very Unlikely.

7. The computer-implemented method of claim 1, wherein determining where fractures are likely to exist comprises using an asymmetric look-up table that bases fracture likelihood combinations on one or both of criteria and probabilities and an application of one or more thresholds.

8. A non-transitory, computer-readable medium storing one or more instructions executable by a computer system to perform operations comprising:
gathering seismic data for a reservoir with unknown fractured and unfractured areas;
generating a structural model based on the seismic data for the reservoir;
building a geomechanical model based on the structural model;
determining, using the geomechanical model, geomechanically-estimated fractured areas including: areas where fractures are not likely to exist based on a likelihood lower than a first threshold likelihood; areas where fractures are likely to exist based on a likelihood greater than a second threshold likelihood; and areas where fracturing is unknown based on a likelihood between the first threshold likelihood and the second threshold likelihood;
determining, using machine learning based on mathematical calculations of the seismic data, machine learning-based estimates of a likelihood of a fracture of each area of the reservoir, wherein a likelihood lower than a third threshold likelihood indicates an unfractured area, and wherein a likelihood greater than a fourth threshold likelihood indicates a fractured area; and
determining, using the geomechanically-estimated fractured areas, the machine learning-based likelihoods, and Bayes' Rule, the fractured and unfractured areas based on where fractures are likely to exist and not exist.

9. The non-transitory, computer-readable medium of claim 8, wherein determining where fractures are likely to exist comprises determining that a fracture exists when:
the geomechanical model indicates a likelihood greater than the second threshold likelihood; and the seismic data includes a likelihood between a third threshold likelihood and a fourth threshold likelihood.

10. The non-transitory, computer-readable medium of claim 8, wherein determining where fractures are likely to exist comprises determining that a fracture exists when:

the geomechanical model indicates a likelihood within a range of the first threshold likelihood and the second threshold likelihood; and the seismic data includes a likelihood greater than the fourth threshold likelihood.

11. The non-transitory, computer-readable medium of claim 8, wherein determining where fractures are likely to exist comprises determining that an existence of a fracture is unsure when:

the geomechanical model indicates a likelihood less than the second threshold likelihood; or the seismic data includes a likelihood less than a third threshold likelihood.

12. The non-transitory, computer-readable medium of claim 8, wherein determining where fractures are likely to exist comprises using a 3-by-3 look-up table with fracture likelihoods of No, Ambiguous, and Yes.

13. The non-transitory, computer-readable medium of claim 8, wherein determining where fractures are likely to exist comprises using a 5-by-5 look-up table with fracture likelihoods of Very Unlikely, Unlikely, Ambiguous, Likely, and Very Unlikely.

14. The non-transitory, computer-readable medium of claim 8, wherein determining where fractures are likely to exist comprises using an asymmetric look-up table that bases fracture likelihood combinations on one or both of criteria and probabilities and an application of one or more thresholds.

15. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

gathering seismic data for a reservoir with unknown fractured and unfractured areas;

generating a structural model based on the seismic data for the reservoir;

building a geomechanical model based on the structural model;

determining, using the geomechanical model, geomechanically-estimated fractured areas including: areas where fractures are not likely to exist based on a likelihood lower than a first threshold likelihood;

areas where fractures are likely to exist based on a likelihood greater than a second threshold likelihood; and areas where fracturing is unknown based on a likelihood between the first threshold likelihood and the second threshold likelihood;

determining, using machine learning based on mathematical calculations of the seismic data, machine learning-based estimates of a likelihood of a fracture of each area of the reservoir, wherein a likelihood lower than a third threshold likelihood indicates an unfractured area, and wherein a likelihood greater than a fourth threshold likelihood indicates a fractured area; and determining, using the geomechanically-estimated fractured areas, the machine learning-based likelihoods, and Bayes' Rule, the fractured and unfractured areas based on where fractures are likely to exist and not exist.

16. The computer-implemented system of claim 15, wherein determining where fractures are likely to exist comprises determining that a fracture exists when:

the geomechanical model indicates a likelihood greater than the second threshold likelihood; and the seismic data includes a likelihood between a third threshold likelihood and a fourth threshold likelihood.

17. The computer-implemented system of claim 15, wherein determining where fractures are likely to exist comprises determining that a fracture exists when:

the geomechanical model indicates a likelihood within a range of the first threshold likelihood and the second threshold likelihood; and the seismic data includes a likelihood greater than the fourth threshold likelihood.

18. The computer-implemented system of claim 15, wherein determining where fractures are likely to exist comprises determining that an existence of a fracture is unsure when:

the geomechanical model indicates a likelihood less than the second threshold likelihood; or the seismic data includes a likelihood less than a third threshold likelihood.

19. The computer-implemented system of claim 15, wherein determining where fractures are likely to exist comprises using a 3-by-3 look-up table with fracture likelihoods of No, Ambiguous, and Yes.

20. The computer-implemented system of claim 15, wherein determining where fractures are likely to exist comprises using a 5-by-5 look-up table with fracture likelihoods of Very Unlikely, Unlikely, Ambiguous, Likely, and Very Unlikely.

* * * * *